US011981199B2

(12) United States Patent
Nahrwold

(10) Patent No.: US 11,981,199 B2
(45) Date of Patent: May 14, 2024

(54) DIG MODE SYSTEM AND METHOD FOR A VEHICLE

(71) Applicant: Dana Automotive Systems Group, LLC, Maumee, OH (US)

(72) Inventor: Thomas L. Nahrwold, Maumee, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 1047 days.

(21) Appl. No.: 16/794,618

(22) Filed: Feb. 19, 2020

(65) Prior Publication Data

US 2021/0252976 A1     Aug. 19, 2021

(51) Int. Cl.
| B60K 17/356 | (2006.01) |
| B60K 1/02 | (2006.01) |
| B60K 6/24 | (2007.10) |
| B60K 6/26 | (2007.10) |
| B60L 7/10 | (2006.01) |

(52) U.S. Cl.
CPC .............. *B60K 17/356* (2013.01); *B60K 1/02* (2013.01); *B60K 6/24* (2013.01); *B60K 6/26* (2013.01); *B60L 7/10* (2013.01); *B60Y 2200/91* (2013.01); *B60Y 2200/92* (2013.01)

(58) Field of Classification Search
CPC ........... B60W 30/045; B60W 2520/10; B60W 2540/10; B60W 2540/18; B60W 2710/081; B60W 2710/083; B60W 2720/28; B60W 2720/403; B60W 10/119; B60W 30/182; B60K 17/356; B60K 1/02; B60K 6/24; B60K 6/26; B60K 6/52; B60K 1/00; B60K 2001/001; B60K 17/354; B60K 17/165; B60K 17/34; B60L 7/10; B60L 7/18; B60L 15/2036; B60L 2220/42; B60L 2240/24; B60L 2240/421; B60L 2240/423; B60L 2240/461; B60L 2260/28; B60L 15/20; B60L 2260/26; B60Y 2200/91; B60Y 2200/92; Y02T 10/62; Y02T 10/64; Y02T 10/72

See application file for complete search history.

(56) References Cited

U.S. PATENT DOCUMENTS

| 11,130,483 B2 * | 9/2021 | Jung ...................... B62D 6/002 |
| 11,543,343 B2 * | 1/2023 | Yang ................ G08G 1/096716 |
| 2006/0196712 A1 * | 9/2006 | Toyota .................... B60L 3/108 180/165 |

(Continued)

OTHER PUBLICATIONS

Engerman, E., "Electric Drive Axle System With a Self-Indexing Clutch and Method for Operation of Said Clutch," U.S. Appl. No. 16/794,703, filed Feb. 19, 2020, 51 pages.

(Continued)

*Primary Examiner* — Adam R Mott
*Assistant Examiner* — Alyzia N Dilworth
(74) *Attorney, Agent, or Firm* — McCoy Russell LLP

(57) ABSTRACT

Methods and systems for operating axles of a vehicle are provided. In one example, a propulsion source of a first axle is operated in a speed control mode at a first speed and a propulsion source of a second axle is operated in a speed control mode at a second speed. The propulsion sources are operated at different speeds to reduce a turning radius of a vehicle.

19 Claims, 3 Drawing Sheets

(56) References Cited

U.S. PATENT DOCUMENTS

2016/0318509 A1\* 11/2016 Rycroft ................ B60T 8/1755
2019/0126759 A1\* 5/2019 Miller ................ B60L 15/2009
2020/0148255 A1\* 5/2020 Korsch ................ B62D 11/08
2021/0276555 A1\* 9/2021 Ren ....................... B60W 10/06

OTHER PUBLICATIONS

Engerman, E., "Electric Drive Axle System With Multi-Speed Gear Train," U.S. Appl. No. 16/794,632, filed Feb. 19, 2020, 37 pages.
Engerman, E. et al., "Electric Axle System With Removable Planetary Gear Assembly," U.S. Appl. No. 16/794,643, filed Feb. 19, 2020, 50 pages.
Nahrwold, T., "Sand Mode System and Method for a Vehicle," U.S. Appl. No. 16/794,647, filed Feb. 19, 2020, 33 pages.
Engerman, E., "Electric Drive Axle Gear Train and Method for Manufacturing Said Gear Train," U.S. Appl. No. 16/794,654, filed Feb. 19, 2020, 48 pages.
Wesolowski, S. et al., "System and Method for Charachterizing a Clutch," U.S. Appl. No. 16/794,675, filed Feb. 19, 2020, 43 pages.
Nahrwold, T. et al., "Systems and Method for Adjusting Vehicle Performance," U.S. Appl. No. 16/794,783, filed Feb. 19, 2020, 34 pages.
Engerman, E., "Vehicle System With Multiple Electric Drive Axles," U.S. Appl. No. 16/795,263, filed Feb. 19, 2020, 43 pages.
Engerman, E., "Electric Drive Axle With Lubrication System," U.S. Appl. No. 16/795,280, filed Feb. 19, 2020, 47 pages.

\* cited by examiner

DIG MODE SYSTEM AND METHOD FOR A VEHICLE

TECHNICAL FIELD

The present disclosure relates to a driveline operating mode for a wheeled vehicle. The system and method may be particularly useful for off-road vehicles.

BACKGROUND AND SUMMARY

A vehicle may be driven off-road from time to time. Depending on the terrain and soil, the vehicle may be operated in four wheel drive (e.g., 4×4 powertrain mode) to improve traction or in two wheel drive (2×4 powertrain mode) to reduce driveline friction and improve vehicle fuel economy. While engaging the vehicle into four wheel drive may improve vehicle traction, it may not improve the vehicle's ability to traverse some off-road areas. For example, some off-road areas include obstacles, such as trees or protruding rocks, which make it difficult for a vehicle to follow a path because the vehicle may have difficulty turning about the obstacles. The vehicle may have to move in a forward direction and then in a reverse direction several times so that the vehicle may be repositioned so that it may pass the obstacles and continue on a path. However, even if the vehicle can change direction to be repositioned, there still may be insufficient room to maneuver the vehicle around the obstacles. Therefore, it may be desirable to provide a way of improving the vehicle's ability to turn where a very tight turning radius may be desired.

The inventors herein have recognized the above-mentioned issues and have developed a method for operating a vehicle powertrain, comprising: operating a first propulsion source providing propulsive effort to a first axle in a first speed control mode to rotate at a first speed; and operating a second propulsion source providing propulsive effort to a second axle in a second speed control mode to rotate at a second speed, the second speed less than the first speed.

By operating two different propulsion sources in speed control modes and at different speeds, it may be possible to provide the technical result of reducing a turning radius of a vehicle. In addition, operating the vehicle in this way may improve the vehicle's ability to climb over obstacles. Further, the approach may also improve a vehicle's hill descent capability. For example, a speed of a propulsion source that is coupled to a front axle may be adjusted to rotate wheels of a vehicle at a speed that is equivalent to propelling the vehicle between 0 and 6 kilometers/hour during conditions when the vehicle is on a flat and straight road when wheel slip is not present. In other words, the speed of the propulsion source that is coupled to the front axle is adjusted such that the circumference of a tire coupled to axle rotates a distance of between 0 and 6 kilometers in one hour. The speed of the propulsion source that is coupled to the rear axle may be adjusted to rotate a tire is 0 kilometers in one hour. Thus, the rear wheels may be held in position while the front wheels are rotated. This may reduce the vehicle's turning radius such that the vehicle may maneuver around obstacles without having to be repositioned by moving forward and then in reverse.

The present description may provide several advantages. In particular, the approach may reduce a turning radius of a vehicle so that the vehicle may follow a desired path. In addition, the approach may improve hill descent by providing improved vehicle control while descending a hill. Further, the approach may improve a vehicle's ability to climb over rocks or other terrain that may be encountered when the vehicle travels off-road.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
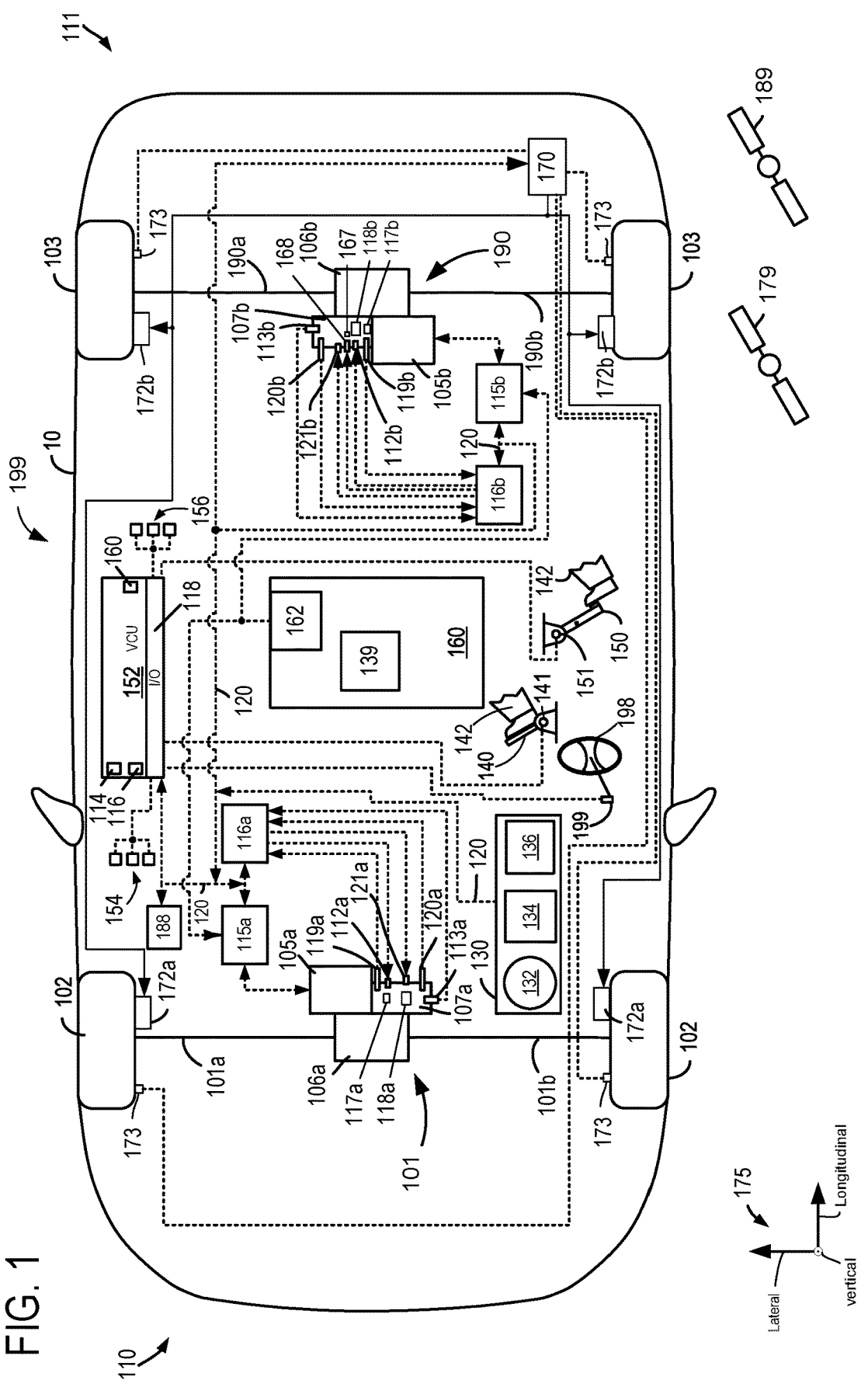
FIG. 1 is a schematic diagram of a first vehicle powertrain.
Figure 3:
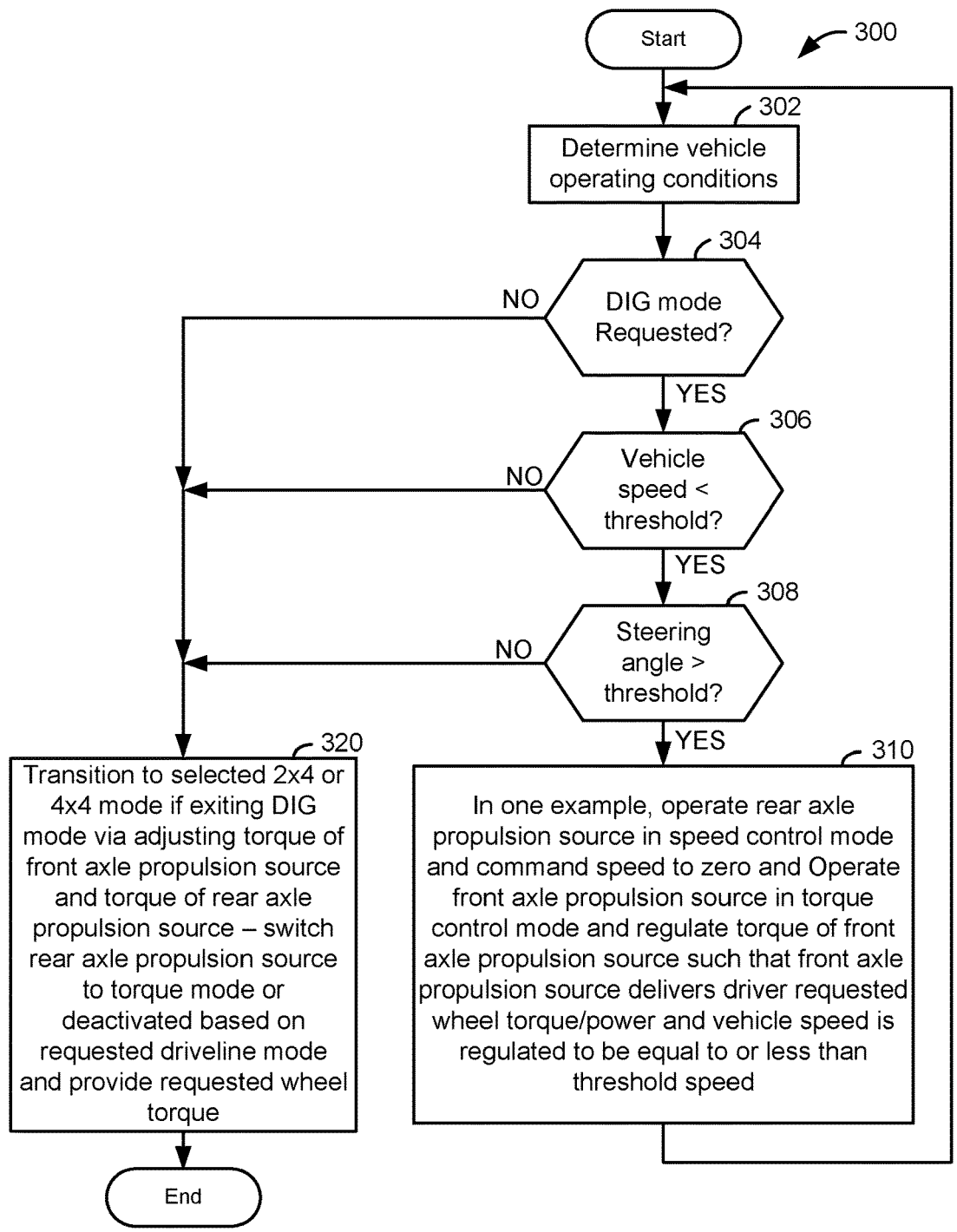
FIG. 3 shows an example method for operating a vehicle's powertrain in a dig mode.

The following description relates to systems and methods for operating a powertrain of a vehicle. The powertrain may include one or more electric machines that may selectively provide power to propel the vehicle. The one or more electric machines may also selectively operate in a regeneration mode whereby the electric machines may convert mechanical energy into electrical energy. The vehicle may be operated in a dig mode where the front axle rotates to propel the vehicle and where the rear axle operates to slow the vehicle so that the vehicle may pivot about object near or in the vehicle's path of travel. The dig mode may also improve vehicle control when the vehicle is descending a hill. FIG. 1 shows an example powertrain where a dig mode may be implemented. FIG. 3 shows an example powertrain operating sequence where a vehicle is operated in a dig mode. The vehicle may be operated in dig mode according to the method of FIG. 4.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes at two propulsion sources 105a and 105b. In one example, propulsion sources 105a and 105b may be electric machines that may operate as motors or generators. In another example, one of propulsion sources 105a and 105b may be an internal combustion engine and the other of propulsion sources 105a and 105b may be an electric machine. Thus, vehicle propulsion system 199 may be an electric vehicle or a hybrid vehicle. If one of propulsion sources 105a or 105b is an internal combustion engine, the internal combustion engine may consume liquid or gaseous fuel. Both or one of propulsion sources 105a and 105b may consume and/or generate electrical power depending on their operating mode. Throughout the description of FIG. 1, mechanical connections and hydraulic connections between the various components are illustrated as solid lines, whereas electrical connections between various components are illustrated as dashed lines.

Vehicle propulsion system 199 includes a front axle 101 and a rear axle 190. Rear axle 190 comprises two half shafts, including a first or right haft shaft 190a and a second or left half shaft 190b. Likewise, front axle 101 comprises a first or right half shaft 101a and a second or left half shaft 101b. Vehicle propulsion system 199 further includes front wheels 102 and rear wheels 103. Front wheels 102 may be selectively driven via propulsion source 105a and rear wheels 103 may be selectively drive via propulsion source 105b. Thus, propulsion system 199 may operate in a four wheel drive mode or a two wheel drive mode.

The rear axle 190 may be an integrated axle that includes a differential 106b, gearbox 107b, and propulsion source 105b. Alternatively, propulsion source 105b and gearbox 107b may be separate from rear axle 190. Gearbox 107b includes a first speed sensor 119b for sensing an input shaft speed, a second speed sensor 120b for sensing a transmission output shaft speed, a clutch actuator 112b, a sprag clutch lock ring actuator 121b, a sprag clutch 117b, and a clutch position sensor 113b. Gearbox 107b may include a parking pawl 167 to selectively prevent rotation of a transmission output shaft of gearbox 107b. The parking pawl may be engaged and disengaged via parking pawl actuator 168. In examples where propulsion source 105b is an electric machine, electric power inverter 115b is electrically coupled to propulsion source 105b. A transmission control unit 116b is electrically coupled to sensors and actuators of gearbox 107b.

Propulsion source 105b may transfer mechanical power to or receive mechanical power from gearbox 107b. As such, gearbox 107b may be a two speed gearbox that may shift between gears when commanded via transmission control unit 116b. Gearbox 107b may transfer mechanical power to or receive mechanical power from differential 106b. Differential 106b may transfer mechanical power to or receive mechanical power from wheels 103 via right half shaft 190a and left half shaft 190b. Propulsion source 105b may consume alternating current (AC) electrical power provided via electrical inverter 115b. Alternatively, propulsion source 105b may provide AC electrical power to electrical inverter 115b. Electrical power inverter 115b may be provided with high voltage direct current (DC) power from electrical energy storage device 160 (e.g., a traction battery or a traction capacitor). Electric power inverter 115b may convert the DC electrical power from electrical energy storage device 160 into AC electrical power for propulsion source 105b. Alternatively, electrical power inverter 115b may be provided with AC power from propulsion source 105b. Electric power inverter 115b may convert the AC electrical power from propulsion source 105b into DC power to store in electrical power storage device 160.

Energy storage device 160 may periodically receive electrical energy from a power source such as a stationary power grid (not shown) residing external to the vehicle (e.g., not part of the vehicle). As a non-limiting example, vehicle propulsion system 199 may be configured as a plug-in electric vehicle (EV), whereby electrical energy may be supplied to energy storage device 160 via the power grid (not shown).

Electric energy storage device 160 includes an electric energy storage device controller 139 and an electrical power distribution box 162. Electric energy storage device controller 139 may provide charge balancing between energy storage element (e.g., battery cells) and communication with other vehicle controllers (e.g., vehicle control unit 10). Power distribution module 139 controls flow of electrical power into and out of electric energy storage device 160.

The front axle 101 may be an integrated axle that includes a differential 106a, gearbox 107a, and propulsion source 105a. Alternatively, propulsion source 105a and gearbox 107a may be separate from front axle 101. Gearbox 107a includes a first speed sensor 119a for sensing an input shaft speed, a second speed sensor 120a for sensing a transmission output shaft speed, a clutch actuator 112a, a sprag clutch lock ring actuator 121a, sprag clutch 117a, and a plate clutch position sensor 113a. In examples where propulsion source 105a is an electric machine, electric power inverter 115a is electrically coupled to propulsion source 105a. A transmission control unit 116a is electrically coupled to sensors and actuators of gearbox 107a.

Propulsion source 105a may transfer mechanical power to or receive mechanical power from gearbox 107a. As such, gearbox 107a may be a two speed gearbox that may shift between gears when commanded via transmission control unit 116a. Gearbox 107a may transfer mechanical power to or receive mechanical power from differential 106a. Differential 106a may transfer mechanical power to or receive mechanical power from wheels 102 via right half shaft 101a and left half shaft 101b. Propulsion source 105a may consume alternating current (AC) electrical power provided via electrical inverter 115a. Alternatively, propulsion source 105a may provide AC electrical power to electrical inverter 115a. Electrical power inverter 115a may be provided with high voltage direct current (DC) power from electrical energy storage device 160 (e.g., a traction battery or a traction capacitor). Electric power inverter 115a may convert the DC electrical power from electrical energy storage device 160 into AC electrical power for propulsion source 105a. Alternatively, electrical power inverter 115a may be provided with AC power from propulsion source 105a. Electric power inverter 115a may convert the AC electrical power from propulsion source 105a into DC power to store in electrical power storage device 160.

Vehicle 10 includes a vehicle control unit (VCU) controller 152 (as also shown in FIG. 1) that may communicate with inverter 115a, inverter 115b, transmission controller 116a, transmission controller 116b, friction or foundation brake controller 170, global positioning system (GPS) 188, and dashboard 130 and components included therein via controller area network (CAN) 120. VCU 152 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156 as shown in FIG. 1. Sensors 154 may include but are not limited to lateral accelerometers, longitudinal accelerometers, yaw rate sensors, inclinometers, temperature sensors, electric energy storage device voltage and current sensors, and other sensors described herein. Additionally, sensors 154 may include steering angle sensor 199, accelerator pedal position sensor 141, vehicle range finding sensors including radio detection and ranging (RADAR), light detection and ranging (LIDAR), sound navigation and ranging (SONAR), and brake pedal position sensor 151. Actuators may include but are not limited to inverters, transmission controllers, display devices, human/machine interfaces, friction braking systems, and electric energy storage device controller described herein.

Accelerator pedal sensor 141 is shown coupled to accelerator pedal 140 for determining a degree of application of accelerator pedal 140 by human 142. Brake pedal sensor 151 is shown coupled to brake pedal 150 for determining a degree of application of brake pedal 150 by human 142. Steering angle sensor 199 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system may also include a dashboard 130 that an operator of the vehicle may interact with. Dashboard 130 may include an interactive weather data display and notification system 134 that may communicate weather forecast data to VCU 152. Weather data display and notification system 134 may receive weather data and forecasts at the vehicle's present location from communications satellite 179. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to initiate and/or terminate operation of the vehicle driveline (e.g., electric machine 105a and electric machine 105b) based on an operator input. Various examples of the operator interface 136 may include interfaces that require a physical apparatus, such as an active key, that may be inserted into the operator interface 136 to activate the electric machines 105a and 105b and to turn on the vehicle 10, or may be removed to shut down the electric machines 105a and 105b to turn off the vehicle. Other examples may include a passive key that is communicatively coupled to the operator interface 136. The passive key may be configured as an electronic key fob or a smart key that does not have to be inserted or removed from the interface 136 to operate the vehicle electric machines 105a and 105b. Rather, the passive key may need to be located inside or proximate to the vehicle (e.g., within a threshold distance of the vehicle). Still other examples may additionally or optionally use a start/stop button that is manually pressed by the operator to start or shut down the electric machines 105a and 105b to turn the vehicle on or off. In other examples, a remote electric machine start may be initiated remote computing device (not shown), for example a cellular telephone, or smartphone-based system where a user's cellular telephone sends data to a server and the server communicates with the vehicle controller 152 to activate an inverter and electric machine. Spatial orientation of vehicle 10 is indicated via axes 175.

Vehicle 10 is also shown with a foundation or friction brake controller 170. Brake controller 170 may selectively apply and release friction brakes 172 via allowing hydraulic fluid to flow to friction brakes 172. Front friction brakes 172a and rear friction brakes 172b may be applied and released so as to avoid locking of friction brakes 172a to wheels 102 and brakes 172b to wheels 103. Wheel position or speed sensors 173 may provide wheel speed data to brake controller 170.

Vehicle propulsion system 199 may provide torque to wheels 102 and 103 to propel vehicle 10. Vehicle propulsion system 199 may operate in a two wheel drive mode where propulsion source 105a or propulsion source 105b is activated and where the other of propulsion source 105a or propulsion source 105b is not activated. Alternatively, vehicle propulsion system may operate in a four wheel drive mode where both electric machines 105a and 105b are activated.

A human or autonomous driver may request a driver demand wheel torque, or alternatively a driver demand wheel power, via applying accelerator pedal 140 or via supplying a driver demand wheel torque/power request to vehicle controller 10. Vehicle controller 152 may then allocate a fraction of the driver demand wheel torque/power to be provided by propulsion source 105a and the remaining amount of driver demand wheel torque/power to be provided via propulsion source 105b when vehicle 10 is operating in a four wheel drive mode. Thus, vehicle controller 152 may determine a torque/power distribution between front axle 101 and rear axle 190. In one example, a baseline torque/power distribution may be 50:50 or 50% of the requested wheel torque/power is to be generated via the front axle 101 and 50% of the requested wheel torque/power is to be generated via the rear axle 190 when vehicle propulsion system 199 is being operated in a four wheel drive mode.

Once vehicle controller 152 determines the torque/power distribution between the front axle 101 and the rear axle 190, vehicle controller 152 may command inverter 115a to deliver the portion of the driver demand wheel torque/power allocated to front axle 101 and may command inverter 115b to deliver the portion of the driver demand wheel torque/power allocated to rear axle 190. Inverters 115a and 115b may convert DC electrical power from electrical energy storage device 160 into AC power and supply the AC power to propulsion source 105a and propulsion source 105b. Propulsion source 105a rotates and transfers torque/power to gearbox 107a. Gearbox 107a may supply torque from propulsion source 105a to differential 106a, and differential 106a transfers torque from propulsion source 105a to wheels 102 via half shafts 101a and 101b. Similarly, propulsion source 105b rotates and transfers torque/power to gearbox 107b. Gearbox 107b may supply torque/power from propulsion source 105b to differential 106b, and differential 106b transfers torque/power from propulsion source 105b to wheels 103 via half shafts 190a and 190b.

During conditions when the accelerator pedal is fully released, vehicle controller 152 may request a small negative or regenerative braking power to gradually slow vehicle 10 when a speed of vehicle 10 is greater than a threshold speed. This regenerative braking power may mimic engine braking of vehicles having an internal combustion engine during vehicle coasting conditions. Vehicle controller 152 may determine a regenerative braking power distribution between front axle 101 and rear axle 190. The amount of regenerative braking power requested may be a function of accelerator pedal position, electric energy storage device state of charge (SOC), vehicle speed, and other conditions. If the accelerator pedal is fully released and vehicle speed is less than a threshold speed, vehicle controller 152 may request a small amount of positive torque/power from propulsion source 105a and/or 105b, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle controller 10. Vehicle controller 152 may then allocate a fraction of the driver demand braking power to be provided by propulsion source 105a and another amount of driver demand braking power to be provided via propulsion source 105b when vehicle 10 is operating in a four wheel drive mode. Additionally, vehicle controller 152 may request that a portion of the driver demanded braking power be provided via friction brakes 172 via commanding brake controller 170 to provide the requested portion of the driver requested braking power. In one example, a baseline braking power distribution may be 65:35 or 65% of the requested braking power is to be generated via the front axle 101 and 35% of the requested braking power is to be generated via the rear axle 190.

After vehicle controller 152 determines the braking power distribution between the front axle 101 and the rear axle 190, vehicle controller 152 may command inverter 115a and/or front friction brakes 172a to deliver the portion of the driver braking power allocated to front axle 101. Vehicle controller 152 may command inverter 115b and/or rear friction brakes 172b to deliver the portion of the driver demand braking power allocated to rear axle 190. Inverters 115a and 115b may convert AC electrical power generated by propulsion sources 105a and 105b converting the vehicle's kinetic energy into DC power for storage in electrical energy device 160.

Transmission control units 116a and 116b include predetermined transmission gear shift schedules whereby second gears of gearboxes 107a and 107b may be selectively engaged and disengaged. Shift schedules stored in transmission control units 116a and 116b may select gear shift points or conditions as a function of driver demand wheel torque and vehicle speed. Transmission control units 116a and 116b may selectively open and close wet or dry plate clutches 118a and 118b to engage and disengage second gear in the respective gearboxes via clutch actuators 112a and 112b.

The system of FIG. 1 provides for a vehicle system, comprising: a first electric machine coupled to a first axle; a second electric machine coupled to a second axle; and a controller including executable instructions stored in non-transitory memory that cause the controller to generate a positive propulsion torque via the first electric machine while generating a regenerative torque via the second electric machine. The system includes where the regenerative torque prevents a wheel of the second axle from rotating at a speed greater than a threshold speed. The system further comprises additional instructions to limit the positive propulsion torque in response to a wheel speed of the first axle exceeding a threshold speed. The system includes where the first axle is a front axle, and where the second axle is a rear axle. The system includes where the first axle is a rear axle, a where the second axle is a front axle. The system includes where the controller generates the positive propulsion torque via the first electric machine while generating the regenerative torque via the second electric machine in response to a request to enter a dig mode.

Figure 2:
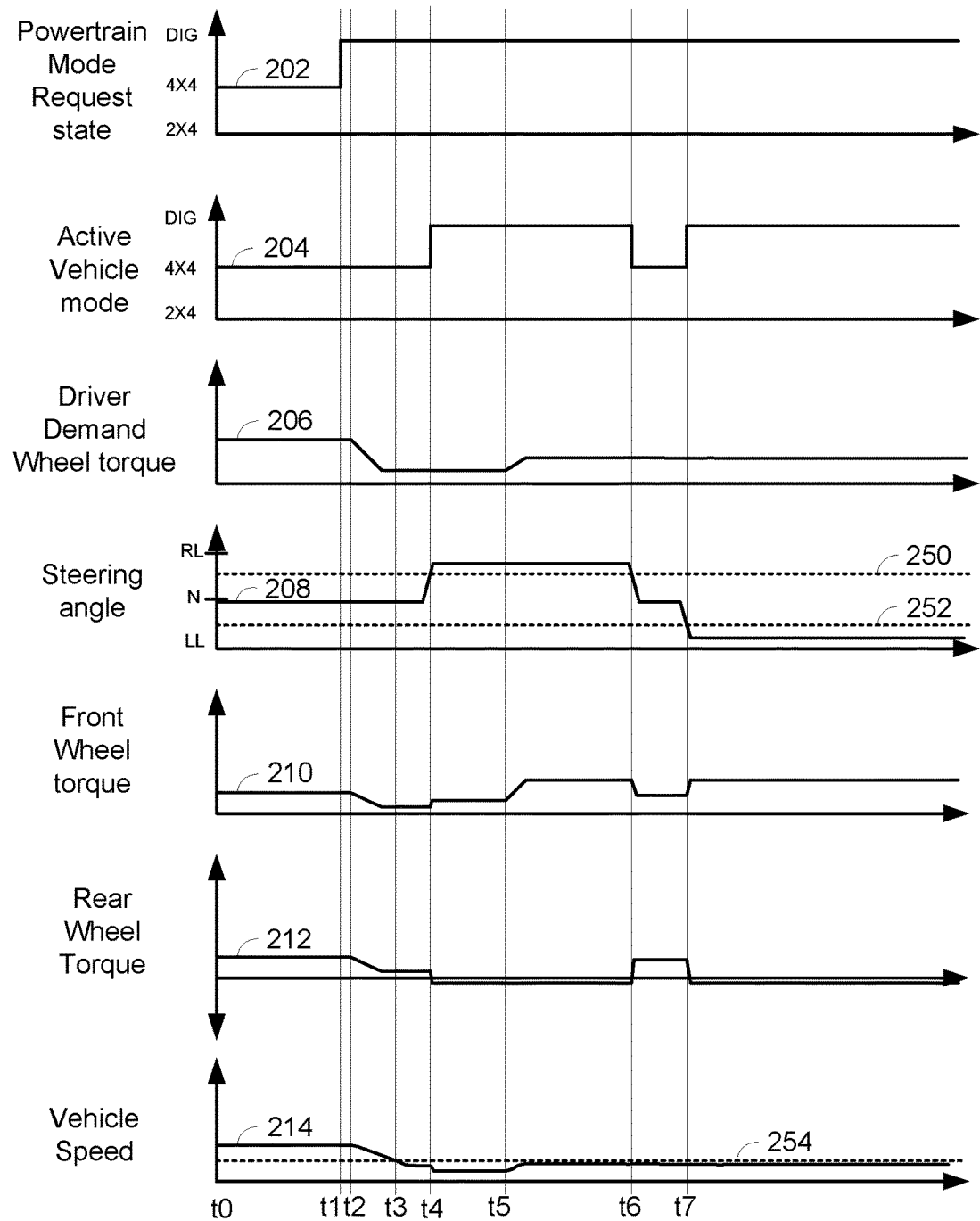
FIG. 2 shows an example powertrain operating sequence according to the method of FIG. 3.

Turning now to FIG. 2, a prophetic powertrain operating sequence according to the method of FIG. 3 is shown. The operating sequence shown in FIG. 2 may be provided via the method of FIG. 2 in cooperation with the system shown in FIG. 1. The plots shown in FIG. 2 occur at the same time and are aligned in time. The vertical lines at t0-t7 represent times of interest during the sequence.

The first plot from the top of FIG. 2 is a plot of a powertrain mode request state versus time. The vertical axis represents the powertrain mode request state and the powertrain is requested to be in a two wheel drive mode when trace 202 is at the vertical axis level indicated as 2×4. The powertrain is requested to be in a four wheel drive mode when trace 202 is at the vertical axis level indicated as 4×4. The powertrain is requested to be in a dig mode when trace 202 is at the vertical axis level indicated as DIG. The horizontal axis represents time and time increases from the left side of the figure to the right side of the figure. Trace 202 represents the powertrain mode request state.

The second plot from the top of FIG. 2 is a plot of an active powertrain mode state versus time. The vertical axis represents the active powertrain mode state and the powertrain is active in a two wheel drive mode when trace 204 is at the vertical axis level indicated as 2×4. The powertrain is active in a four wheel drive mode when trace 204 is at the vertical axis level indicated as 4×4. The powertrain is active in a dig mode when trace 204 is at the vertical axis level indicated as DIG. The horizontal axis represents time and time increases from the left side of the figure to the right side of the figure. Trace 204 represents the activate powertrain mode state.

The third plot from the top of FIG. 2 is a plot of driver demand wheel torque versus time. The vertical axis represents driver demand wheel torque and the driver demand wheel torque increases in the direction of the vertical axis arrow. The horizontal axis represents time and time increases from the left side of the figure to the right side of the figure. Trace 206 represents the driver demand wheel torque.

The fourth plot from the top of FIG. 2 is a plot of steering angle versus time. The vertical axis represents steering angle and steering angle is zero or neutral when trace 208 is at the vertical axis level of N. The neutral position is the steering position where both front wheels are directed straight ahead such that the vehicle will travel in a straight direction and not turn. The right wheel lock position is indicated along the vertical axis as RL. The steering wheel is rotated as far right as possible when trace 208 is at the RL position. The left wheel lock position is indicated along the vertical axis as LL. The steering wheel is rotated as far left as possible when trace 208 is at the LL position. Horizontal line 250 represents a steering angle that when exceeded may cause the vehicle to enter dig mode. In other words, if trace 208 is between horizontal line 250 and RL, then the powertrain may enter dig mode. Horizontal line 252 represents a steering angle that when exceeded may cause the vehicle to enter dig mode. In other words, if trace 208 is between horizontal line 252 and LL, then the powertrain may enter dig mode. Trace 208 represents the steering angle.

The fifth plot from the top of FIG. 2 is a plot of front wheel torque versus time. The vertical axis represents front wheel torque and the front wheel torque increases in the direction of the vertical axis arrow. The horizontal axis represents time and time increases from the left side of the figure to the right side of the figure. Trace 210 represents the front wheel torque.

The sixth plot from the top of FIG. 2 is a plot of rear wheel torque versus time. The vertical axis represents rear wheel torque and the rear wheel torque increases in the direction of the vertical axis arrow. The horizontal axis represents time and time increases from the left side of the figure to the right side of the figure. Trace 212 represents the rear wheel torque.

The seventh plot from the top of FIG. 2 is a plot of vehicle speed versus time. The vertical axis represents vehicle speed and the vehicle speed increases in the direction of the vertical axis arrow. The horizontal axis represents time and time increases from the left side of the figure to the right side of the figure. Trace 214 represents the vehicle speed. Horizontal line 254 represents a vehicle speed threshold below which the vehicle may enter dig mode.

At time t0, four wheel drive mode is requested and the powertrain is in four wheel drive mode. The driver demand torque is at a middle level and the steering angle is at the neutral position. The front wheel torque and the rear wheel torque are equal and they sum to the driver demand torque. The vehicle speed is above threshold 254.

At time t1, the vehicle's driver (not shown) requests dig mode. However, dig mode is not activated because vehicle speed is greater than threshold 254 and because the steering angle is too small. The driver demand wheel torque is unchanged and the steering angle is unchanged. The front wheel torque and the rear wheel torque are unchanged.

At time t2, the vehicle's driver (not shown) reduces the driver demand wheel torque, which in turn causes the front and rear wheel torques to be reduced. The vehicle is still not activated in dig mode because vehicle speed is greater than threshold 254 and because the steering angle is too small.

At time t3, vehicle speed is less than threshold 254 and dig mode is still requested, but dig mode is not activated because the steering angle is still small. The driver demand wheel torque is reduced to a lower level and the front and rear wheel torques are at lower levels. The vehicle speed continues to decrease.

At time t4, the vehicle's driver (not shown) has turned the steering wheel to the right far enough that the steering angle is beyond threshold 250 while vehicle speed is less than threshold 254. Dig mode is still being requested, so the dig mode is activated. The driver demand torque is low and the rear axle propulsion source is commanded to enter speed control mode with a requested rear wheel speed of zero. Alternatively, the rear axle may be commanded to enter torque control mode and to provide a regenerative braking torque. In speed control mode, a propulsion source is commanded to follow a requested speed while torque of the propulsion source is allowed to vary. Conversely, when a propulsion source is in a torque control mode, speed of the propulsion source is allowed to vary while torque of the propulsion source follows a requested torque. By requesting that the rear axle enter speed control mode with a requested speed of zero, the rear wheels may drag such that the vehicle may turn and pull in the direction that the front wheels are pointed, thereby allowing the vehicle to pivot. The propulsion source of the front axle is commanded to a torque control mode and it is commanded to provide the requested wheel torque minus the negative wheel torque provided by the rear axle propulsion source. It should be noted that when a propulsion source is commanded to provide a wheel torque, the actual torque provided via the propulsion source is the requested wheel torque divided by the gear ratio between the propulsion source and the wheel. Continuing with the sequence at time t4, the rear wheel torque changes to a negative wheel torque and the front wheel torque is equal to the requested wheel torque minus the negative wheel torque provided via the rear axle.

At time t5, the vehicle's driver (not shown) increases the driver demand wheel torque request and vehicle speed increases, but vehicle speed remains below threshold 254 so the vehicle remains in dig mode. Dig mode continues to be requested and the steering angle remains above threshold 250. The front wheel torque increases to follow the driver demand wheel torque and the rear wheel torque remains unchanged since the vehicle is driving in loose soil, which allows the wheels to remain at zero speed without applying additional torque.

At time t6, the vehicle's driver (not shown) has rotated the steering wheel to the left such that the steering angle no longer exceeds threshold 250, which causes the powertrain to exit dig mode even though dig mode continues to be requested. The rear axle propulsion source exits speed control mode and enters torque control mode. The rear axle wheel torque is increased and the front wheel torque is decreased so that the rear wheel torque plus the front wheel torque is equal to the driver demand wheel torque. The vehicle speed remains below threshold 254.

At time t7, the vehicle's driver (not shown) has rotated the steering wheel to the left such that the steering angle exceeds threshold 252, which causes the powertrain to activate dig mode. The rear axle propulsion source exits torque control mode and reenters speed control mode. The rear axle wheel torque is decreased and the front wheel torque is increased so that the rear wheel torque plus the font wheel torque is equal to the driver demand wheel torque. The vehicle speed remains below threshold 254.

In this way, a vehicle may enter and exit dig mode via steering angle and vehicle speed conditions. However, such conditions for entering and exiting dig mode may be overridden when specific conditions are met, if desired. In addition, as detailed in the description of FIG. 3, dig mode may be activated in more than a single way.

Referring now to FIG. 3, an example method for operating a powertrain in a dig mode is shown. The method of FIG. 3 may be incorporated into and may cooperate with the system of FIG. 1. Further, at least portions of the method of FIG. 3 may be incorporated as executable instructions stored in non-transitory memory while other portions of the method may be performed via a controller transforming operating states of devices and actuators in the physical world.

At 302, method 300 determines vehicle operating conditions. Vehicle operating conditions may include but are not limited to requests for dig mode, steering angle, vehicle speed, and presently engaged powertrain mode. Method 300 may determine the vehicle operating conditions via the sensors and controllers described herein. Method 300 proceeds to 304.

At 304, method 300 judges if dig mode is requested. A request for dig mode may be made via a human/machine, or an operator interface, or via an autonomous driver requesting dig mode via an input to vehicle controller 152. In addition, dig mode may be requested while the vehicle's transmission is engaged in drive (e.g., forward gears) or reverse. If method 300 judges that dig mode is requested, the answer is yes and method 300 proceeds to 306. Otherwise, the answer is no and method 300 proceeds to 320.

At 320, method 300 transitions to a two wheel drive or a four wheel drive powertrain mode if the vehicle is presently engaged in dig mode. If the powertrain is not engaged in dig mode, then the powertrain remains in its presently selected mode. The powertrain mode may be requested via the human/machine interface or via the operator interface. If the powertrain is presently engine in dig mode and the powertrain was engaged in four wheel drive mode immediately prior to entering dig mode, the powertrain reverts back to four wheel drive mode. If the powertrain is presently engine in dig mode and the powertrain was engaged in two wheel drive mode immediately prior to entering dig mode, the powertrain reverts back to two wheel drive mode.

The powertrain may be transitioned to four wheel drive mode from dig mode in one of several ways. If the rear axle propulsion source was operating in speed control mode while in dig mode, then the rear axle propulsion source changes from operating in the speed control mode to operating in a torque control mode. The transition may begin by determining the present wheel torque request and the torque distribution between the front and the rear axle. The present wheel torque request may be determined from accelerator pedal position and vehicle speed. In particular, as described in greater detail below, accelerator pedal and vehicle speed may be inputs into a table or function that returns a requested or demanded wheel torque. The torque distribution between the front and the rear axle may be a base distribution (e.g., 50:50) that is retrieved via controller ROM. The requested wheel torque may be determined by multiplying the driver requested wheel torque by the distribution percentage allocated to the rear axle. For example, if the driver demand wheel torque is 600 Newton-meters (Nm) and the torque distribution to the rear axle is 50%, then the rear wheel torque request is 600 Nm·0.5=300 Nm. The present torque output of the rear axle propulsion source from operating the rear axle propulsion source in the speed control mode may then be changed at a predetermined rate or ramped until the rear axle wheel torque is equal to the presently requested wheel torque that is allocated to the rear axle.

If the rear axle propulsion source was operating in a negative torque or regenerative braking control mode while in dig mode, then the rear axle propulsion source changes to operating in a motoring torque control mode or a positive torque control mode. The transition may begin by determining the present wheel torque request and the torque distribution between the front and the rear axle as previously discussed. The present torque output of the rear axle propulsion source may then be changed at a predetermined rate or ramped until the rear axle wheel torque is equal to the presently requested wheel torque that is allocated to the rear axle.

If the front axle propulsion source was operating in speed control mode while in dig mode, then the front axle propulsion source changes from operating in the speed control mode to operating in a torque control mode. The transition may begin by determining the present wheel torque request and the torque distribution between the front and the rear axle as previously mentioned. The present torque output of the front axle propulsion source from operating the front axle in the speed control mode may then be changed at a predetermined rate or ramped until the front axle wheel torque is equal to the presently requested wheel torque that is allocated to the front axle.

If the front axle propulsion source was operating in a torque control mode delivering positive torque while in dig mode, then the front axle propulsion source remains operating in the torque control mode delivering positive torque. The present torque output of the front axle propulsion source may then be changed at a predetermined rate or ramped until the front axle wheel torque is equal to the presently requested wheel torque that is allocated to the front axle.

The powertrain may be transitioned to rear drive two wheel drive mode from dig mode in one of several ways. If the rear axle propulsion source was operating in speed control mode while in dig mode, then the rear axle propulsion source changes from operating in the speed control mode to operating in a torque control mode. The transition may begin by determining the present wheel torque request. The present torque output of the rear axle propulsion source from operating the rear axle propulsion source in the speed control mode may then be changed at a predetermined rate or ramped until the rear axle wheel torque is equal to the presently requested wheel torque. The front axle torque is adjusted from a positive torque to zero torque.

If the rear axle propulsion source was operating in a negative power or regenerative braking control mode while in dig mode, then the rear axle propulsion source changes to operating in a motoring torque control mode or a positive torque control mode. The transition may begin by determining the present wheel torque request. The present torque output of the rear axle propulsion source may then be changed at a predetermined rate or ramped until the rear axle wheel torque is equal to the presently requested wheel torque. The front axle torque is adjusted from a positive torque to zero torque.

The powertrain may be transitioned to front drive two wheel drive mode from dig mode in one of several ways. The transition may begin by determining the present wheel torque request. The front axle propulsion source may be changed to operating in torque mode if the front axle propulsion source was operating in speed control mode. If the front axle propulsion source was operating in a torque control mode, it remains in a torque control mode. The present torque output of the front axle propulsion source may then be changed at a predetermined rate or ramped until the front axle wheel torque is equal to the presently requested wheel torque. The rear axle torque is adjusted to zero torque. Method 300 proceeds to exit.

At 306, method 300 judges if the present vehicle speed is less than a threshold vehicle speed (e.g., 6 kilometers/hour). If the present vehicle speed is less than the threshold speed, the answer is yes and method 300 proceeds to 308. Otherwise, the answer is no and method 300 proceeds to 320. In some examples, step 306 may be bypassed or eliminated if desired.

At 308, method 300 judges if the present vehicle steering angle is greater than a threshold vehicle steering angle (e.g., 20 degrees). If the present vehicle steering angle is greater than the threshold angle, the answer is yes and method 300 proceeds to 310. Otherwise, the answer is no and method 300 proceeds to 320. In some examples, step 308 may be bypassed or eliminated if desired.

At 310, method 300 transitions operating the powertrain into dig mode. If the powertrain is presently in two wheel drive mode, then the propulsion source of the front axle or the propulsion source of the rear axle is activated from a deactivated state and the other of the front axle or rear axle propulsion source remains activated. If the powertrain is presently in four wheel drive mode, both the front axle and rear axle propulsion sources remain active when entering dig mode.

The powertrain may be transitioned to dig mode from four wheel drive mode in one of several ways. In a first example, the rear axle propulsion source may be transitioned from operating in a torque control mode to operating in a speed control mode when dig mode is engaged. The front axle propulsion source may also be transitioned into a speed control mode. The transition may begin by changing from interpreting a driver demand wheel torque command from accelerator pedal position and vehicle speed to interpreting a vehicle or front wheel speed command from the accelerator pedal position. In one example, the vehicle or wheel speed command is zero when the accelerator pedal is fully released and the requested vehicle speed or front wheel speed increases to a maximum vehicle speed or front wheel speed (e.g., 6 kilometers/hour) when the accelerator pedal is fully applied. The torque requested from the front axle propulsion source is increased or decreased at a predetermined rate until the front wheel speed or vehicle speed is equal to the driver demand wheel or vehicle speed. The front axle propulsion source torque output is then adjusted such that the front wheel speed or vehicle speed follows or is equal to the driver demand wheel speed or vehicle speed. The propulsion source of the rear axle is operated in a speed control mode and torque of the rear axle propulsion source is adjusted so that the rear wheel speed is less than a threshold speed (e.g., less than 0.25 kilometers/hour). In some examples, the propulsion source of the rear axle is adjusted to provide zero wheel speed and torque provided by the front axle propulsion source is constrained to provide less than a threshold amount of torque to provide the requested front wheel speed.

In a second example, the rear axle propulsion source may be transitioned from operating in a torque control mode to operating in a speed control mode when dig mode is engaged. The front axle propulsion source may remain operating in a torque control mode. The transition may begin by interpreting a driver demand wheel torque command from accelerator pedal position and vehicle speed and commanding the front axle propulsion source to provide the driver demand wheel torque plus wheel torque generated by the rear propulsion source to prevent the rear wheel speed from matching the front wheel speed. The wheel torque request for the front axle propulsion source may be expressed via the following equation: Tw_front=Tdd−Tw_rear, where Tw_front is the front wheel torque request, Tdd is the driver demand wheel torque as determined from accelerator pedal position and vehicle speed, and Tw_rear is the torque provided at the rear wheels by the rear axle propulsion source. Thus, if the driver demand wheel torque is 60 Nm and the rear axle propulsion source is providing −10 Nm to maintain rear wheel speed at zero, then the front wheel torque requested of the front axle propulsion source is 70 Nm. The 70 Nm provided at the front wheels when combined with the −10 Nm at the rear wheels is equal to the driver demand wheel torque. In this way, the driver demand wheel torque may be delivered by the vehicle. It should be noted that the front axle propulsion source torque multiplied by the gear ratio between the propulsion source and the wheel is equal to Tw_front=Tdd−Tw_rear. The wheel torque of the rear axle immediately before entering dig mode is adjusted at a predetermined rate so that the rear wheel speed is equal to a requested rear wheel speed. Once rear wheel speed is equal to the requested wheel speed, torque of the rear propulsion source is adjusted to maintain the requested rear wheel speed.

In a third example, the rear axle propulsion source may be transitioned from operating in a positive torque control mode to operating in a negative torque or regenerative torque control mode when dig mode is engaged. The front axle propulsion source may remain operating in a torque control mode. The transition may begin by interpreting a driver demand wheel torque command from accelerator pedal position and vehicle speed and commanding the front axle propulsion source to provide the driver demand wheel torque plus wheel torque generated by the rear propulsion source to prevent the rear wheel speed from matching the front wheel speed. The wheel torque request for the front axle propulsion source may be expressed via the following equation: Tw_front=Tdd−Tw_rear, where Tw_front is the front wheel torque request, Tdd is the driver demand wheel torque as determined from accelerator pedal position and vehicle speed, and Tw_rear is the torque provided at the rear wheels by the rear axle propulsion source. The wheel torque of the rear axle immediately before entering dig mode is adjusted at a predetermined rate from a positive torque to a negative or regenerative torque so that the rear wheel torque prevents or slows the rear wheels from rotating due to the torque generated at the front axle. The rear axle wheel torque may be adjusted to a predetermined negative torque amount (e.g., −20 Nm).

If the vehicle is operating in a two wheel drive mode before entering dig mode, then a propulsion source that is deactivated is reactivated. In addition, the vehicle enters dig mode via one of the previously mentioned ways and follows the driver demand speed or wheel torque request. Method 300 returns to 302.

In this way, a vehicle may enter dig mode. The dig mode may be provided via operating the propulsion sources in speed control modes and/or torque control modes. The propulsion sources may be electric machines, or in some examples, one of the propulsion sources may be an internal combustion engine while the other propulsion source is an electric machine.

The method of FIG. 3 provides for a method for operating a vehicle powertrain, comprising: operating a first propulsion source providing propulsive effort to a first axle in a first speed control mode to rotate a first wheel at a first speed; and operating a second propulsion source providing propulsive effort to a second axle in a second speed control mode to rotate a second wheel at a second speed, the second speed less than the first speed. The method includes where the first propulsion source and the second propulsion source are electric machines. The method includes where the first speed is limited to less than a threshold speed, and where the second speed is limited to less than a second threshold speed. The method includes where the second axle is a rear axle, and where the first axle is a front axle.

In some examples, the method further comprises not operating the first propulsion source in the first speed control mode and not operating the second propulsion source in the second speed control mode in response to a steering angle being less than a threshold angle. The method further comprises not operating the first propulsion source in the first speed control mode and not operating the second propulsion source in the second speed control mode in response to a vehicle speed being greater than a threshold speed. The method further comprises operating the first propulsion source in the first speed control mode and operating the second propulsion source in the second speed control mode in response to a request to enter a dig mode.

The method of FIG. 3 also provides for a method for operating a vehicle powertrain, comprising: operating a first propulsion source providing propulsive effort to a first axle in a torque control mode; and operating a second propulsion source providing propulsive effort to a second axle in a speed control mode while operating the first propulsion source in the torque control mode. The method includes where first propulsion source is an internal combustion engine, and where the second propulsion source is an electric machine. The method includes where second propulsion source is an internal combustion engine, and where the first propulsion source is an electric machine. The method further comprises commanding the second propulsion source to a speed that is less than a threshold speed. The method includes where the speed is zero. The method further comprises providing a driver demand wheel torque via the first propulsion source. The method further comprises limiting the driver demand wheel torque in response to a wheel speed.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle powertrain, comprising:
operating a first propulsion source providing propulsive effort to a first axle in a first speed control mode to rotate a first wheel at a first speed; and
operating a second propulsion source providing propulsive effort to a second axle in a second speed control mode to rotate a second wheel at a second speed, the second speed less than the first speed,
wherein, in the first speed control mode and the second speed control mode, the first propulsion source and the second propulsion source are commanded to follow a respective requested speed while torque is allowed to vary.

2. The method of claim 1, where the first propulsion source and the second propulsion source are electric machines.

3. The method of claim 2, where the first speed is limited to less than a threshold speed, and where the second speed is limited to less than a second threshold speed.

4. The method of claim 1, where the second axle is a rear axle, and where the first axle is a front axle.

5. The method of claim 1, further comprising not operating the first propulsion source in the first speed control mode and not operating the second propulsion source in the second speed control mode in response to a steering angle being less than a threshold angle.

6. The method of claim 1, further comprising not operating the first propulsion source in the first speed control mode and not operating the second propulsion source in the second speed control mode in response to a vehicle speed being greater than a threshold speed.

7. The method of claim 1, further comprising operating the first propulsion source in the first speed control mode and operating the second propulsion source in the second speed control mode in response to a request to enter a dig mode.

8. A method for operating a vehicle powertrain, comprising:
operating a first propulsion source providing propulsive effort to a first axle in a torque control mode; and
operating a second propulsion source providing propulsive effort to a second axle in a speed control mode while operating the first propulsion source in the torque control mode,
wherein operating the second propulsion source in the speed control mode includes commanding the second propulsion source to follow a requested speed while torque of the second propulsion source is allowed to vary.

9. The method of claim 8, where first propulsion source is an internal combustion engine, and where the second propulsion source is an electric machine.

10. The method of claim 8, where second propulsion source is an internal combustion engine, and where the first propulsion source is an electric machine.

11. The method of claim 8, further comprising commanding the second propulsion source to a speed that is less than a threshold speed.

12. The method of claim 11, where the speed is zero.

13. The method of claim 8, further comprising providing a driver demand wheel torque via the first propulsion source.

14. The method of claim 13, further comprising limiting the driver demand wheel torque in response to a wheel speed.

15. A vehicle system, comprising:
a first electric machine coupled to a first axle;
a second electric machine coupled to a second axle; and
a controller including executable instructions stored in non-transitory memory that cause the controller to, during a dig mode, generate a positive propulsion torque via the first electric machine while generating a regenerative torque via the second electric machine, the controller further including executable instructions stored in the non-transitory memory that cause the controller to limit the positive propulsion torque output by the first electric machine in response to a wheel speed of the first axle exceeding a threshold speed such that the first electric machine is commanded to follow a respective requested speed while torque of the first electric machine is allowed to vary.

16. The system of claim 15, where the regenerative torque prevents a wheel of the second axle from rotating at a speed greater than a threshold speed.

17. The system of claim 15, where the first axle is a front axle, and where the second axle is a rear axle.

18. The system of claim 15, where the first axle is a rear axle, and where the second axle is a front axle.

19. The system of claim 15, where the controller generates the positive propulsion torque via the first electric machine while generating the regenerative torque via the second electric machine in response to a request to enter the dig mode.

\* \* \* \* \*